US007011177B2

(12) United States Patent
Machida et al.

(10) Patent No.: US 7,011,177 B2
(45) Date of Patent: Mar. 14, 2006

(54) ENGINE CONTROL APPARATUS FOR MOTORCYCLES

(75) Inventors: Kenichi Machida, Saitama (JP); Katsuhiro Ouchi, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 203 days.

(21) Appl. No.: 10/627,762

(22) Filed: Jul. 28, 2003

(65) Prior Publication Data

US 2004/0050609 A1    Mar. 18, 2004

(30) Foreign Application Priority Data

Jul. 31, 2002  (JP)  ............... 2002-223678

(51) Int. Cl.
*B60K 28/12*    (2006.01)
(52) U.S. Cl. ............ 180/284; 340/440; 701/112
(58) Field of Classification Search ............ 180/284, 180/283, 282, 219; 340/440, 689; 701/45, 701/112; 123/198 D, 198 DC
See application file for complete search history.

(56) References Cited

U.S. PATENT DOCUMENTS 5,033,428 A * 7/1991 Sasaki .................. 123/198 D
6,268,794 B1 * 7/2001 Tzanev .................. 340/440
6,536,401 B1 * 3/2003 McConnell .............. 123/198 D
6,584,388 B1 * 6/2003 Schubert et al. .......... 701/46
6,648,702 B1 * 11/2003 Nanami et al. ........... 440/1

FOREIGN PATENT DOCUMENTS

JP    59231162 A  * 12/1984

* cited by examiner

*Primary Examiner*—David R. Dunn
(74) *Attorney, Agent, or Firm*—Birch, Stewart, Kolasch & Birch, LLP

(57) ABSTRACT

To enable restart of an engine by detecting that a vehicle is restored to the upright position after overturning in an early state. An acceleration sensor having a detection axis laid laterally of a vehicle body is integrated into an ECU and mounted on the vehicle body. Outputs of the acceleration sensor are weighted and averaged, and when an average value exceeds an overturn threshold repeatedly, an overturn determination unit determines that the vehicle is overturned. On the other hand, when outputs of the acceleration sensor are determined to be below a restoration threshold, and the determination is repeatedly made, it is determined that the vehicle is restored from the overturned state. The engine is stopped when determination of overturn is made, while restart of the engine is enabled when determination of restoration is made. Especially, the reference value of determination is set so that determination of restoration is made at an early stage.

20 Claims, 6 Drawing Sheets

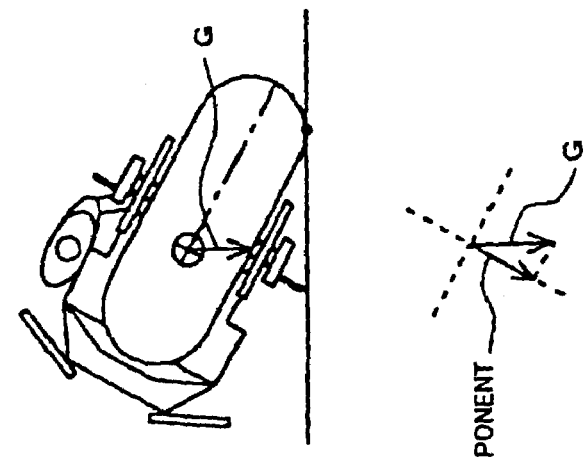
FIG. 5(a) ⟨WHEN STANDING UPRIGHT/TRAVELING STRAIGHT AHEAD⟩
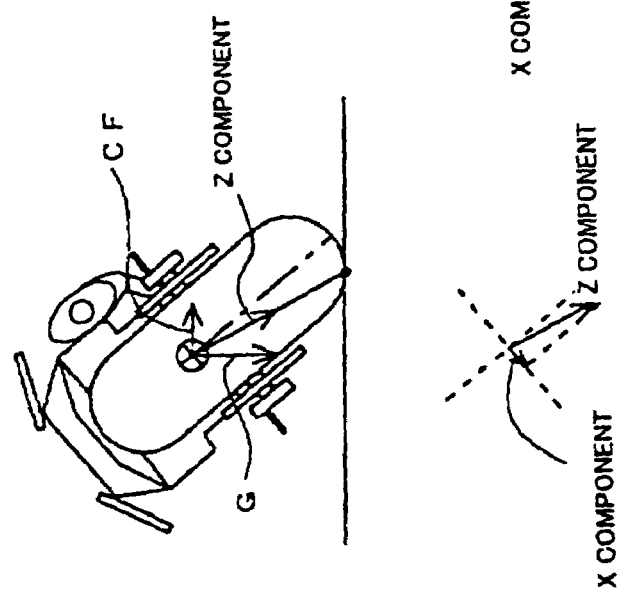
FIG. 5(b) ⟨WHEN TURNING⟩
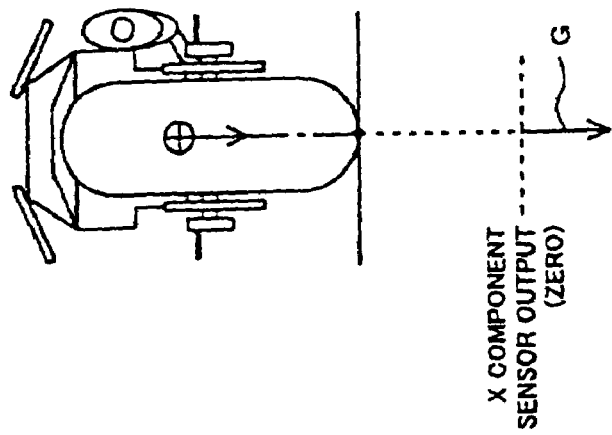
FIG. 5(c) ⟨WHEN OVERTURNED⟩

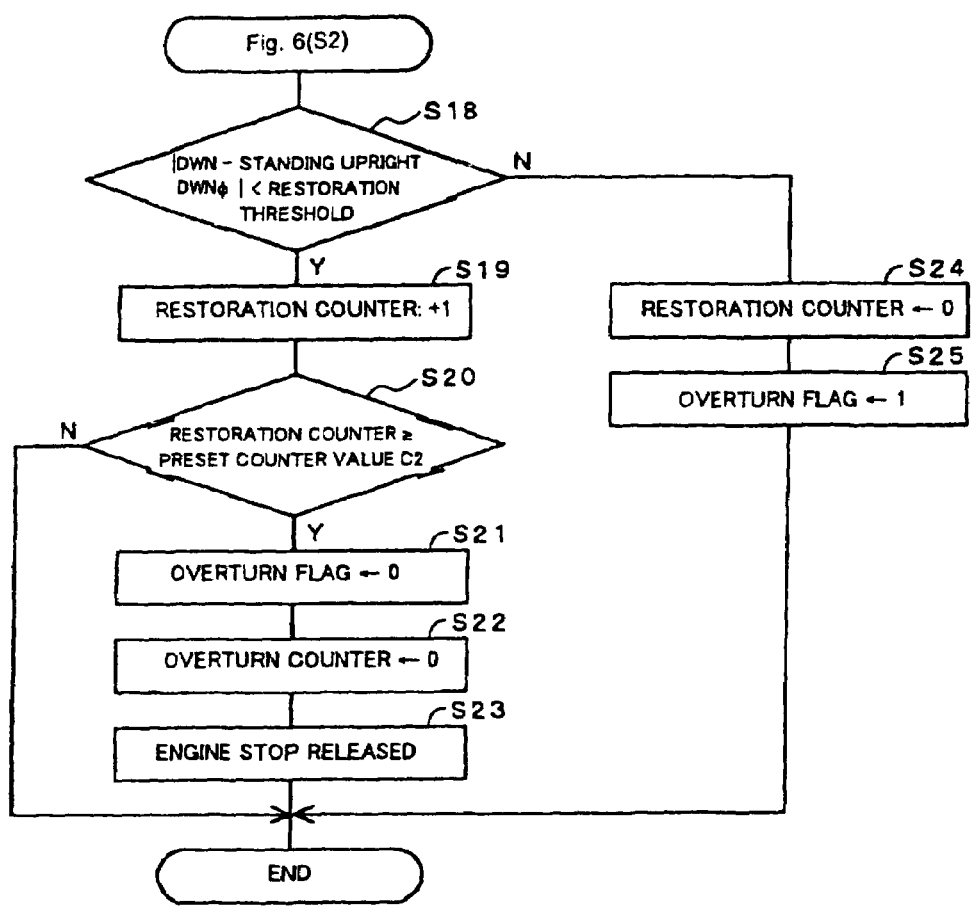

ENGINE CONTROL APPARATUS FOR MOTORCYCLES

CROSS-REFERENCE TO RELATED APPLICATIONS

This nonprovisional application claims priority under 35 U.S.C. § 119(a) on Patent Application No. 2002-223678, filed in Japan on Jul. 31, 2002, the entirety of which is incorporated herein by reference.

BACKGROUND OF THE INVENTION

1. Field of the Invention

The present invention relates to an engine control apparatus for a motorcycle. More specifically, the present invention is directed to an engine control apparatus for a motorcycle that is capable of stopping an engine when a vehicle is overturned, and restarting the engine quickly when the vehicle is restored from the overturned state.

2. Description of Related Art

JP-A-2000-71703 discloses a motorcycle having an acceleration sensor which is used as an overturn sensor, wherein fuel injection and ignition are controlled to stop when the overturn sensor detects overturning of the motorcycle.

The aforementioned motorcycle still experiences some problems that must be overcome. For example, there are cases where the overturning of the vehicle did not produce any damage to the vehicle body, or damage was negligible and hence the motorcycle could travel without any problems thereafter. In such cases, riders may want to restore the vehicle body to the upright position, and restart the engine quickly. For example, in the case of a racing motorcycle, if the engine cannot be restarted immediately after restoration from the overturned state in a short time for continuing the race, the racer will lose time. Therefore, the racer will be at a disadvantage in the race. However, in the case of a related art motorcycle, erroneous detection is prevented by filtering or timer-controlling outputs detected by the acceleration sensor. Accordingly, it takes time for the sensor to determine that the motorcycle has been restored to the upright position.

SUMMARY OF THE INVENTION

In view of such requirements, it is an object of the invention to provide an engine control apparatus for a motorcycle in which restoration of the vehicle body to the upright position is recognized in a short time for restarting the engine.

In order to achieve the aforementioned object, the present invention provides an engine control apparatus for a motorcycle including an overturn detecting unit for detecting overturning by an acceleration sensor having a detection axis disposed laterally of the vehicle body. An engine stopping unit is provided for stopping the engine in response to detection of the overturning by the overturn detecting unit. The overturn detecting unit is constructed to determine that the motorcycle has overturned when the number of times the acceleration sensor detects average values of outputs exceeding an overturn threshold reaches a first preset value. In addition, a restoration unit is provided for releasing the engine stop operation by the engine stopping unit when the number of times the acceleration sensor detects outputs below a restoration threshold reaches a second preset value after the overturning of the vehicle body is detected. The second preset value is smaller than the first preset value.

According to a second aspect of the present invention, the restoration threshold is set to a value smaller than the aforementioned overturn threshold.

According to a third aspect of the present invention, a weight assigning unit is provided for assigning a lesser weight for the higher detected output to reflect the detected output on the average value according to the deviation of the detected output of the acceleration sensor with respect to the average value.

According to the first aspect of the present invention, the motorcycle is not determined as having been overturned until the outputs of the acceleration sensor are averaged and exhibit the overturn threshold a preset number of times. Accordingly, the reliability of determination can be increased by reducing the effects of irregular accelerations, such as vibration components of the vehicle body or acceleration during travel in an inclined state. On the other hand, the determination of restoration does not depend on the average value, and the second preset value for determination of restoration is set to a smaller number of times than the first preset value. Accordingly, the restoration of the vehicle body to the upright position is determined at an early stage for restarting operation of the engine.

According to the second aspect of the present invention, the determination of restoration is made and hence engine restart is enabled when the outputs from the acceleration sensor are a smaller value in comparison with the outputs obtained in a state of being overturned. The outputs from the acceleration sensor are obtained when the vehicle body is restored to the upright position after it is determined to have been overturned.

According to the third characteristic, a smaller weight is assigned to the value largely deviated from the average value of outputs of the acceleration sensor, as in the case of the first characteristic. Accordingly, reliability of determination may be increased by reducing the effect of irregular acceleration. On the other hand, no weight is assigned to the outputs from the acceleration sensor when restored. Accordingly, the detection of restoration may be made quickly, and thus the engine may be restarted immediately.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 5(a), 5(b) and 5(c) are drawings showing decompositions of forces acting on a vehicle body;

FIG. 7 is a flow chart of another overturn detecting procedure.

DETAILED DESCRIPTION OF THE PREFERRED EMBODIMENTS

Figure 2:
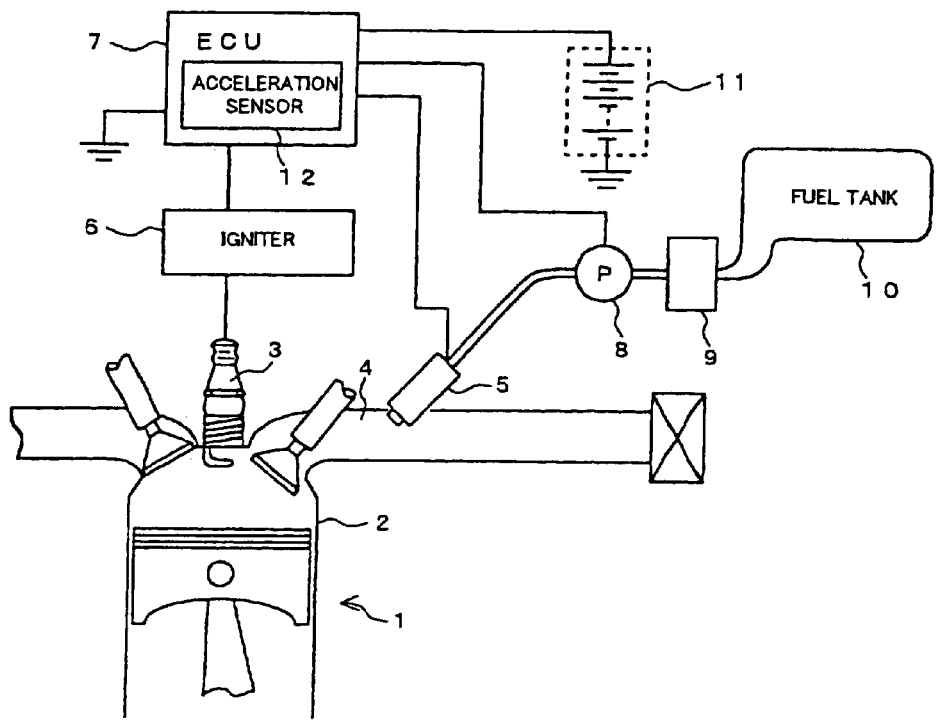
FIG. 2 is a block diagram showing a principle portion of a motorcycle to which an engine control apparatus of the present invention is applied.

Referring now to the drawings, the present invention will be described in detail. FIG. 2 is a block diagram showing a principle portion of a motorcycle to which an engine control apparatus of the present invention is applied. In FIG. 2, an engine 1 is provided with an ignition plug 3 on a cylinder 2. An inlet pipe 4 is provided with a fuel injection valve 5. The ignition plug 3 is connected to an ECU 7 via an igniter 6. The fuel injection valve 5 is connected to a fuel tank 10 via a fuel pump 8 or a filter 9. The fuel injection valve 5 and the fuel pump 8 are also connected electrically to the ECU 7. The ECU 7 includes a microcomputer, which allows the igniter 6 to generate a high pressure in accordance with an ignition timing, a fuel injection timing, and the like determined based on signals detected by a sensor, not shown (engine rotational angle sensor, throttle sensor, intake manifold pressure (PB) sensor, etc.) for detecting the state of rotation of the engine. The microcomputer also allows the fuel injection valve 5 to open and close. A battery 11 is provided as a control power source for the ECU 7, or a power source for electric equipment of the fuel pump 8, the fuel injection valve 5, and the like.

The ECU 7 is provided with an acceleration sensor 12 mounted thereon, which detects acceleration when the motorcycle is overturned and outputs the overturn signal. When the acceleration sensor 12 detects the overturning of the motorcycle, the ECU 7 stops the engine 1. More specifically, the ECU 7 stops the igniter 6, or stops driving of the fuel injection valve 5. It is preferable to stop the fuel pump 8 in conjunction with the stop of the fuel injection valve 5.

The acceleration sensor 12 may be, for example, a capacitance type. The capacitance type acceleration sensor 12 has a detection mass that is displaced in the direction of acceleration in accordance with the magnitude of acceleration. The detection mass has a capacitor electrode, and is constructed to be capable of detecting electric capacity in accordance with displacement of the detection mass. Therefore, acceleration may be determined in accordance with the detected electric capacity. Such an acceleration sensor is commercially available in the shape of a rectangular parallelepiped, for example, in the order of 5 mm×5 mm×2 mm.

Preferably, the acceleration sensor 12 is secured on a substrate, and is mounted in the ECU 7 together with other electronic components. By mounting the acceleration sensor 12 in the ECU 7, the arrangement of the electrical harness is facilitated, and the acceleration sensor 12 can be protected by a case of the ECU 7 when the vehicle is overturned.

Figure 3:
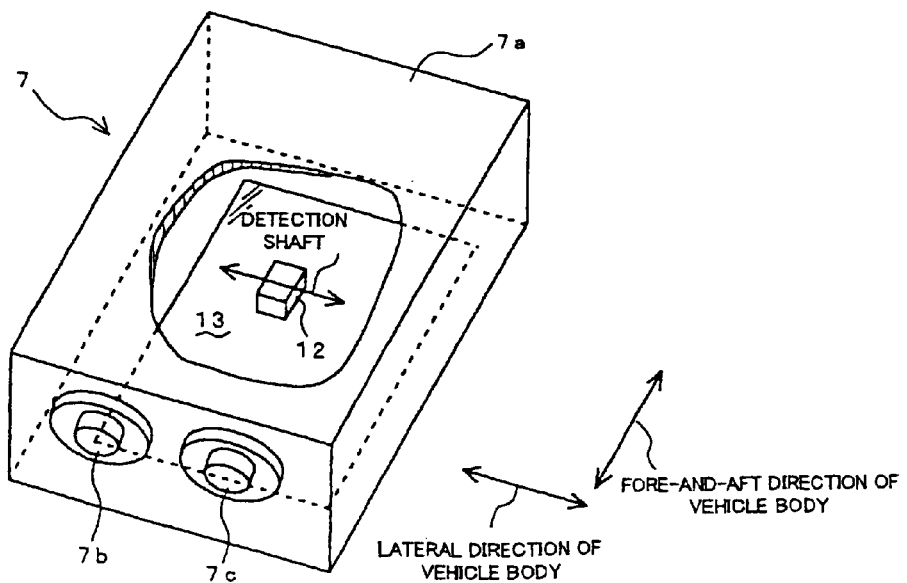
FIG. 3 is a cross-sectional perspective view of a principal portion of an ECU illustrating an arrangement of an accelerator sensor.

FIG. 3 is a cross sectional perspective view of a principal portion of the ECU 7 illustrating an arrangement of the acceleration sensor 12. In FIG. 3, a substrate 13 is disposed in a hard case 7a of the ECU 7, and the capacitance type acceleration sensor 12 is secured to the substrate 13 together with other electronic components. I/O connectors 7b, 7c are provided on the side surface of a case 7a. The ECU 7 is mounted on the vehicle body in such a manner that the detection axis of the acceleration sensor 12 lays laterally of the vehicle body. By arranging the detection axis so as to lie laterally of the vehicle body, the acceleration sensor 12 becomes dull with respect to the pitching action (swinging motion in the fore-and-aft direction) of the vehicle body during travel, and lateral inclination of the vehicle body may be accurately detected.

By arranging the acceleration sensor 12 with the detection axis laid laterally of the vehicle body, turning travel with a large banking angle and overturning may be distinguished. The reason will be described later in conjunction with FIG. 5.

Figure 4:
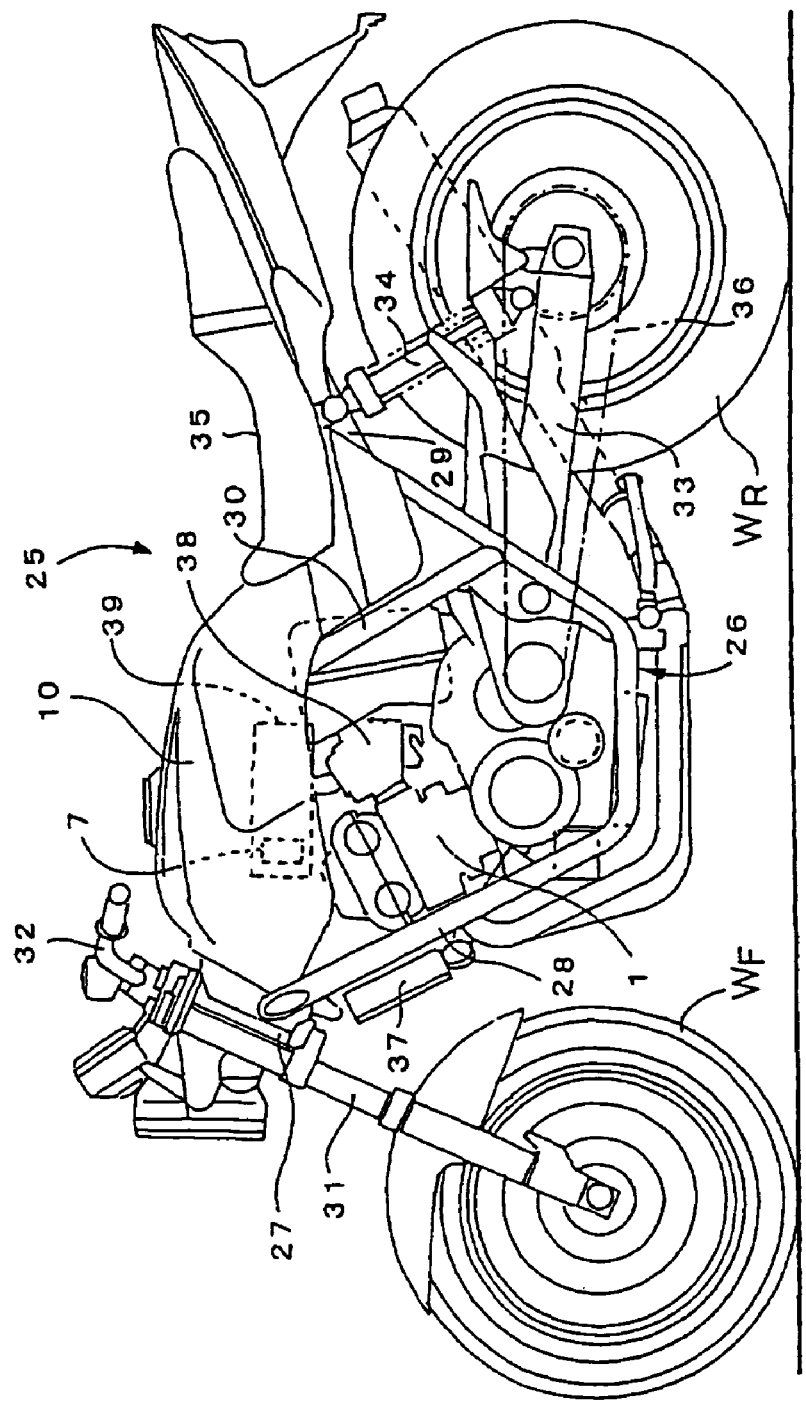
FIG. 4 is a side view of a motorcycle.

FIG. 4 is a side view of the motorcycle having an acceleration sensor as an overturn sensor. In FIG. 4, a vehicle body frame 26 of a motorcycle 25 includes a head pipe 27 provided at the front of the vehicle body, and a main frame 28 connected to the head pipe 27 at the front end and bifurcated and extended along the right and left sides of the vehicle body toward the rear of the vehicle body. A seat stay 29 is connected to the rear ends of the main frame 28 so as to extend rearward and upward. The rear ends of the seat stay 29 are connected by a connecting frame 30.

A front fork 31 is rotatably supported by the head pipe 27. A steering handle 32 is connected to the top of the front fork 31, and a front wheel WF is attached to the lower end thereof. A rear fork 33 for supporting a rear wheel WR is supported by the rear portion of the main frame 28. A pair of cushion units 34 may be provided between the rear wheel WR and the seat stay 29.

A fuel tank 10 is mounted on the main frame 28 and the connecting frame 30 above the engine 1. A seat 35 is mounted on the seat stay 29.

The engine 1 is supported by the main frame 28 and the connecting frame 30, and outputs of the engine 1 is transmitted to the rear wheel WR via a speed changer that is built in the engine 1 and a chain transmission device 36. A radiator 37 is disposed at the front of the engine 1. The engine 1 may have a plurality of cylinders, and each cylinder includes an intake port and an exhaust port.

A throttle body 38 is provided on the intake port side, and an air cleaner box 39 is disposed above the throttle body 38. The aforementioned ECU 7 is disposed in the air cleaner box 39. The ECU 7 is disposed with the aforementioned I/O connectors 7b, 7c facing upward and the detection axis lying laterally of the vehicle body as described above.

The ECU 7 and the acceleration sensor 12 accommodated therein are further protected from an external force by disposing the ECU 7 itself in a space enclosed by the engine 1 and the fuel tank 10 at the center of the vehicle.

FIGS. 5(a), 5(b) and 5(c) are drawings of the motorcycle viewed from behind. FIG. 5(a) shows a state in which the vehicle is standing upright, FIG. 5(b) shows a state in which the vehicle is turning at a large banking angle, and FIG. 5(c) shows a state in which the vehicle is overturned. Acceleration components that act on the acceleration sensor 12 provided on the vehicle will be described in each state.

When the vehicle is standing upright, as shown in FIG. 5(a), an acceleration of gravity G is exerted downward on the vehicle body. In contrast, acceleration horizontally of the vehicle body (a component in the direction x) is substantially zero. That is, an output of the acceleration sensor 12 is substantially zero.

When the vehicle is turning, a centrifugal force CF acts in the horizontal direction, and a resultant force of the centrifugal force CF and the acceleration of gravity G acts in the direction toward a ground point of a tire as a component in the direction z. When the vehicle is turning, a component in the direction x of this resultant force (component in the direction z) is detected by the acceleration sensor 12. However, as will be understood from FIG. 5(b), the value, that is, the output from the sensor, is small.

In contrast, since no centrifugal force is generated when the vehicle is overturned shown in FIG. 5(c), a partial output of the acceleration of gravity G according to the inclination of the vehicle body is detected by the acceleration sensor 12 as an acceleration in the direction x. Since the component in the direction z gets closer to the acceleration of gravity G with an increase in inclination of the vehicle body, when the vehicle body is in the overturned state, an acceleration, which is almost the same as the acceleration of gravity G is detected by the acceleration sensor 12 as the component in the direction x.

In this manner, the component in the direction x of the accelerations in both cases are significantly different between the case in which the vehicle is turning and the case in which the vehicle is overturned even when the inclinations of the vehicle body are almost the same. Therefore, when the acceleration sensor 12 is installed with its detection axis laid horizontally, the inclination of the vehicle body during turning may be clearly distinguished from the inclination of the vehicle body when being overturned based on the detected output of the acceleration sensor 12.

Figure 6:
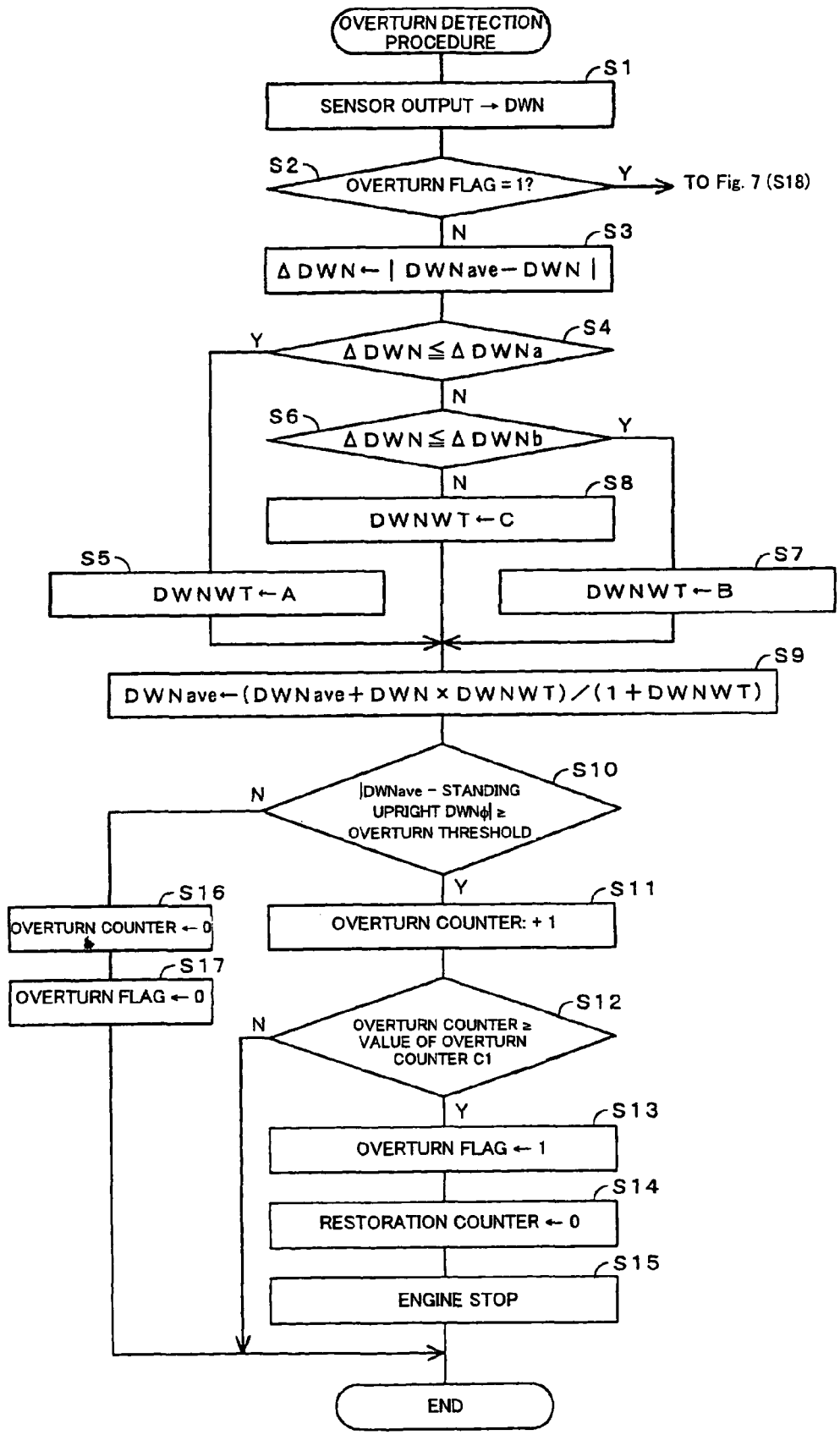
FIG. 6 is a flow chart of an overturn detecting procedure.

FIG. 6 and FIG. 7 are flow charts of the determination of overturn based on the output of the acceleration sensor. In Step S1 in FIG. 6, outputs of the acceleration sensor 11 are read and stored as a detected value DWN. In Step S2, whether a flag showing the present state (overturn flag) is "=1", which is a value indicating that the vehicle body is overturned, or "=0", which is a value indicating that the vehicle body is not overturned is determined. As the overturn flag is reset to "0" at the beginning, it is determined as negative, and thus the procedure goes to Step S3. In Step S3, a difference between the latest output of the sensor DWN and an average value (DWNave) of the outputs of the acceleration sensor accumulated from the beginning of detection is stored as a value ΔDWN. The difference ΔDWN represents a deviation of the latest output of the sensor with respect to the average of the outputs of the sensor obtained until that moment.

In Step S4, whether or not the difference ΔDWN is smaller than a preset differential value ΔDWNa is determined. The preset differential value ΔDWNa is set to a value smaller than a preset differential value ΔDWNb, which will be described later. In other words, in Step S4, whether or not a deviation of the output of the acceleration sensor from the average value is within a predetermined range of small difference is determined.

When the answer of Step S4 is affirmative, the procedure goes to Step S5, and the preset weight value "A" is stored as a weight value DWNWT. The weight value is a value of weight assigned to the average value ΔDWNave. This value is used for preventing the average value from being influenced by the abnormal values, which may be generated when a large detected value due to noise or the like is read. In this case, the weight assignment is divided into three stages. The preset weight value "A" is the largest value "1.0", the preset weight value "B" is "0.5", and the preset weight value "C" is "0.25".

When the answer of Step S4 is negative, the procedure goes to Step S6, and whether or not the difference ΔDWN is smaller than the larger preset differential value DWNb is determined. When the determination results in affirmative, that is, when the degree of deviation is determined to be medium, the procedure goes to Step S7, and the preset weight value "B" is stored as a weight value DWNWT. When the answer of Step S6 is negative, that is, when the degree of deviation is determined to be large, the procedure goes to Step S8, ad the preset weight value "C" is stored as a weight value DWNWT.

In Step S9, an average value of the weighted x components is calculated using the following expression 1.

$$DWNave = (DWNave + DWN \times DWNWT)/(1 + DWNWT) \quad \text{expression 1}$$

In Step S10, whether or not the difference between the sensor output when standing upright DWNΦ and the average DWNave when the vehicle is standing upright is larger than the predetermined overturn threshold is determined. If the determination is affirmative, the procedure goes to Step S11, and the overturn counter is incremented. In Step S12, whether or not the value of the overturn counter exceeds the preset counter value "C1" is determined. The value of the preset counter value "C1" is preferably 4 or 5. When the answer of Step S12 is affirmative, in Step S13, the overturn flag is set to "1" to store that the vehicle body is in the overturned state. In Step S14, the restoration counter is reset to "0". In Step S15, the engine 1 is stopped. More specifically, power supply to the igniter 6 is stopped. Then, the fuel injection valve 5 is stopped from driving. It is preferable to stop the fuel pump 8 in response to stopping of the fuel injection valve 5.

When the answer of Step S10 is negative, the overturn counter is set to "0" in Step S16, and the overturn flag is set to "0" in Step S17.

When it is determined to be overturned and the overturn flag is set to "1", the answer of Step S2 is affirmative and the procedure goes to Step S18 (FIG. 7). In Step S18, whether or not the difference between the sensor output when standing upright DWNϕ and the sensor output DWN is smaller than the restoration threshold is determined. In other words, whether or not the vehicle body is raised to the upright position is determined. This restoration threshold is set to a value smaller than the aforementioned overturn threshold. It is for enabling earlier determination of restoration.

When the answer of Step S18 is affirmative, the procedure goes to Step S19 and the restoration counter is incremented. In Step 20, whether or not the value of the restoration counter exceeded the preset counter value "C2" is determined. The preset counter value "C2" is preferably set to a value smaller than the preset counter value C1 for overturn determination. When the answer in Step S20 is affirmative, the overturn flag is set to "0" and the fact that the normal state is restored is stored in Step S21. In Step S22, the overturn counter is set to "0".

In Step S23, the stopping of the engine is released. More specifically, power supply to the igniter 6 is enabled. In addition, driving of the fuel injection valve 5 is enabled. If the fuel pump 8 is stopped, it is restarted.

When the answer of Step S18 is negative, the procedure goes to Step S24, and the restoration counter is reset to "0". In Step S25, the overturn flag is set to "1", which indicates overturning.

Figure 1:
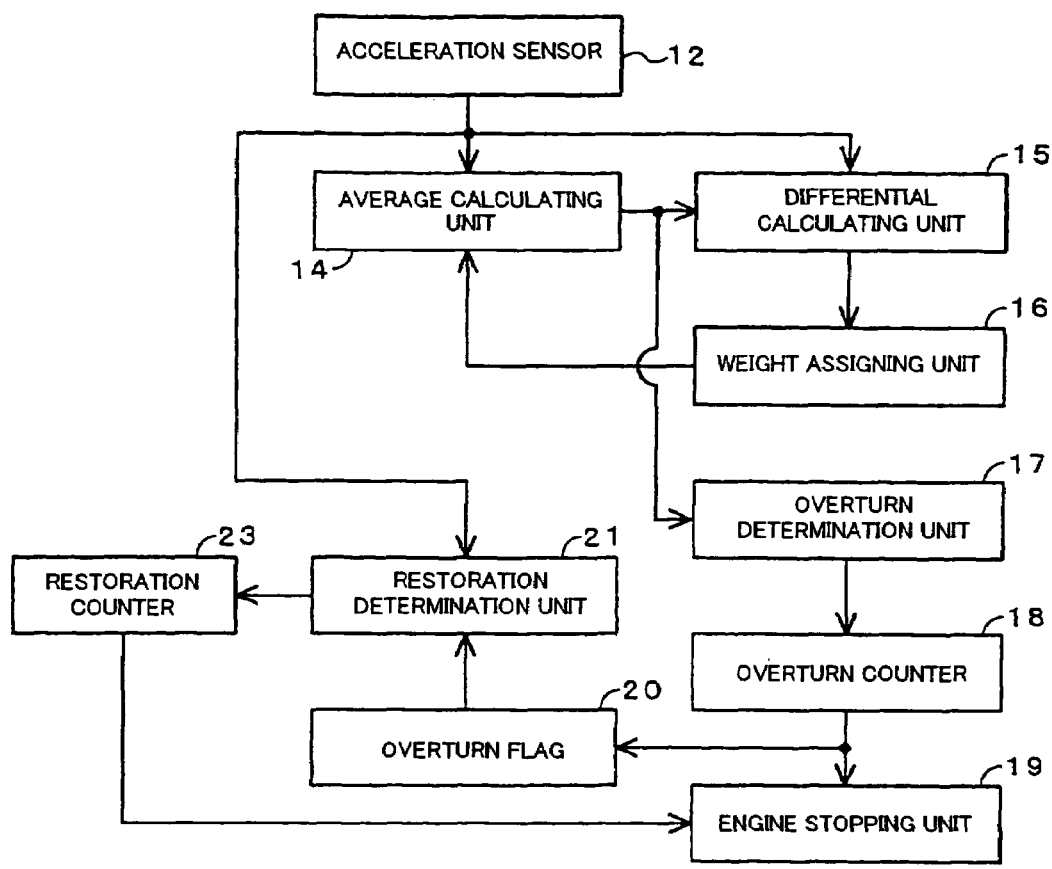
FIG. 1 is a block diagram showing a function of a principal portion of a control apparatus according to an embodiment of the present invention.

FIG. 1 is a block diagram showing a function of a principal portion of the engine control apparatus that performs actions described above. An average calculating unit 14 calculates an average of the outputs of the acceleration sensor 12 (sensor outputs). A differential calculating unit 15 calculates the degree of deviation of the latest sensor output from the average, that is, the differential value. A weight assigning unit 16 assigns a weight to the differential value. The larger the differential value, the smaller the value of weight to be set becomes, and the smaller the differential value, the larger the value of weight to be set becomes. Since the sensor output averaged by the average calculating unit 14 reflects the result of weight assigning, influence of abnormal values with respect to the calculated average value may be reduced.

An overturn determination unit 17 determines that the vehicle is overturned according to the average value of the sensor outputs depending whether it exceeds the overturn threshold. The number of times of determination of overturn is counted by an overturn counter 18. When the value of the overturn counter 18 reaches the predetermined value, it finally confirms the determination of overturn, and outputs the engine stop instruction to an engine stopping unit 19. In response to the engine stopping instruction, an overturn flag 20 is set.

The restoration determination unit 21 observes the overturn flag 20, and when the overturn flag 20 is set, the restoration determination unit 21 is actuated. The restoration determination unit 21 determines that the overturned state is removed when the sensor outputs are below the restoration threshold. When the value of a restoration counter 23 reaches the predetermined value as a result of counting the number of times of determination of removal of the overturned state by the restoration counter 23, determination that the vehicle is standing upright is confirmed and the engine stop cancellation instruction is supplied to the engine stopping unit 19.

According to the present invention, an engine can be stopped by determining the overturning of a vehicle body by outputs of an acceleration sensor, and immediate restart of the engine can be enabled by determining that the vehicle body is raised to the upright position by outputs of the acceleration sensor.

Especially, since the detected values of the acceleration sensor are averaged, and then it is determined that the vehicle is overturned when the overturn threshold is repeatedly detected, determination of overturn may reliably be made without being influenced by the irregular outputs of the acceleration sensor. On the other hand, when the vehicle is restored from the overturned state, restarting of the engine can be enabled, without depending on the average of the outputs of the acceleration sensor, by determining that the vehicle is restored immediately when the restoration threshold is detected.

According to the second aspect of the present invention, since the restoration threshold is set to a value smaller than the overturn threshold, a determination of restoration from overturn may be made at an early stage.

According to the third aspect of the present invention, a light weight is assigned to a detected value that is largely deviated from the averaged output of the acceleration sensor, and a heavy weight is assigned to a detected value that is less deviated from the averaged output. Accordingly, the average value of acceleration is not subject to influence of irregular signals, and hence accurate determination of overturn is achieved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An engine control apparatus for a vehicle comprising:
   an overturn detecting unit for detecting overturning by an acceleration sensor having a detection axis disposed laterally of a body of the vehicle; and
   an engine stopping unit for stopping an engine of the vehicle in response to overturning detection by said overturn detecting unit,
   wherein said overturn detecting unit is constructed to determine that the vehicle has overturned when a number of times said acceleration sensor detects average values of outputs exceeding an overturn threshold reaches a first preset value, and said overturn detecting unit is provided with a restoration unit for releasing the engine stop by said engine stopping unit when the number of times said acceleration sensor detects outputs below a restoration threshold reaches a second preset value after the overturning of the body of the vehicle is detected.

2. The engine control apparatus for a motorcycle according to claim 1, wherein said second preset value is smaller than said first preset value.

3. The engine control apparatus for a motorcycle according to claim 1, wherein said restoration threshold is set to a value smaller than said overturn threshold.

4. The engine control apparatus for a motorcycle according to claim 2, wherein said restoration threshold is set to a value smaller than said overturn threshold.

5. The engine control apparatus for a motorcycle according to claim 1, wherein a weight assigning unit assigns a lesser weight for a higher detected output from said acceleration sensor according to the deviation of the higher detected output of said acceleration sensor from said average value.

6. The engine control apparatus for a motorcycle according to claim 2, wherein a weight assigning unit assigns a lesser weight for a higher detected output from said acceleration sensor according to the deviation of the higher detected output of said acceleration sensor from said average value.

7. The engine control apparatus for a motorcycle according to claim 3, wherein a weight assigning unit assigns a lesser weight for a higher detected output from said acceleration sensor according to the deviation of the higher detected output of said acceleration sensor from said average value.

8. The engine control apparatus for a motorcycle according to claim 4, wherein a weight assigning unit assigns a lesser weight for a higher detected output from said acceleration sensor according to the deviation of the higher detected output of said acceleration sensor from said average value.

9. The engine control apparatus for a motorcycle according to claim 1, wherein a light weight is assigned to a detected output from the acceleration sensor that is largely deviated from the average value of the acceleration sensor, and a heavy weight is assigned to a detected output from the acceleration sensor that is less deviated from the average value.

10. The engine control apparatus for a motorcycle according to claim 2, wherein a light weight is assigned to a detected output from the acceleration sensor that is largely deviated from the average value of the acceleration sensor, and a heavy weight is assigned to a detected output from the acceleration sensor that is less deviated from the average value.

11. The engine control apparatus for a motorcycle according to claim 3, wherein a light weight is assigned to a detected output from the acceleration sensor that is largely deviated from the average value of the acceleration sensor, and a heavy weight is assigned to a detected output from the acceleration sensor that is less deviated from the average value.

12. The engine control apparatus for a motorcycle according to claim 4, wherein a light weight is assigned to a detected output from the acceleration sensor that is largely deviated from the average value of the acceleration sensor, and a heavy weight is assigned to a detected output from the acceleration sensor that is less deviated from the average value.

13. A method of controlling an engine for a vehicle, comprising:
    detecting overturning of the vehicle by an acceleration sensor having a detection axis disposed laterally of a body of the vehicle when a number of times said acceleration sensor detects average values of outputs exceeding an overturn threshold reaches a first preset value;
    stopping an engine of the vehicle when it has been detected that the vehicle has overturned;
    releasing the engine stop when the number of times said acceleration sensor detects outputs below a restoration threshold reaches a second preset value after the overturning of the body of the vehicle is detected.

14. The method of controlling an engine for a vehicle according to claim 13, further comprising the step of setting said second preset value smaller than said first preset value.

15. The method of controlling an engine for a vehicle according to claim 13, further comprising the step of setting said restoration threshold to a value smaller than said overturn threshold.

16. The method of controlling an engine for a vehicle according to claim 14, further comprising the step of setting said restoration threshold to a value smaller than said overturn threshold.

17. The method of controlling an engine for a vehicle according to claim 13, further comprising the step of assigning a light weight to a detected output from the acceleration sensor that is largely deviated from the average value of the acceleration sensor, and a heavy weight to a detected output from the acceleration sensor that is less deviated from the average value.

18. The method of controlling an engine for a vehicle according to claim 14, further comprising the step of assigning a light weight to a detected output from the acceleration sensor that is largely deviated from the average value of the acceleration sensor, and a heavy weight to a detected output from the acceleration sensor that is less deviated from the average value.

19. The method of controlling an engine for a vehicle according to claim 15, further comprising the step of assigning a light weight to a detected output from the acceleration sensor that is largely deviated from the average value of the acceleration sensor, and a heavy weight to a detected output from the acceleration sensor that is less deviated from the average value.

20. The method of controlling an engine for a vehicle according to claim 16, further comprising the step of assigning a light weight to a detected output from the acceleration sensor that is largely deviated from the average value of the acceleration sensor, and a heavy weight to a detected output from the acceleration sensor that is less deviated from the average value.

* * * * *